United States Patent [19]
Sieben et al.

[11] Patent Number: 5,880,870
[45] Date of Patent: Mar. 9, 1999

[54] OPTICAL MODULATION SYSTEM

[75] Inventors: Michael J. Sieben; Jan Conradi, both of Edmonton; David E. Dodds, Saskatoon, all of Canada

[73] Assignee: Telecommunications Research Laboratories

[21] Appl. No.: 738,573

[22] Filed: Oct. 28, 1996

[51] Int. Cl.$^6$ .................................................. H04B 10/04
[52] U.S. Cl. ......................... 359/181; 359/254; 359/279
[58] Field of Search .................................. 359/180, 181, 359/183, 188, 190, 154, 254, 279; 385/3

[56] References Cited

U.S. PATENT DOCUMENTS

| | | | |
|---|---|---|---|
| 4,688,705 | 8/1987 | Smith | 455/109 |
| 5,301,058 | 4/1994 | Olshansky | 359/188 |
| 5,420,868 | 5/1995 | Chraplyvy | 370/122 |
| 5,621,471 | 4/1997 | Kim et al. | 348/473 |

OTHER PUBLICATIONS

Lee and Messerschmidt, *Digital Communications*, Kluwer Academic Publishers, 1988, pp. 239–240.

A. Djupsjöbacka et al., "Dispersion Compensation by Differential Time Delay," *IEEE Journal of Lightwave Technology*, vol. 12, No. 10, pp. 1849–1853, (Oct. 1994).

R.M. Jopson et al., "10–Gb/s 360–km Transmission Over Normal–Dispersion Fiber Using Mid–system Spectral Inversion," *Proceedings OFC'93*, paper PD3, (1993).

F. Koyama et al., "Frequency Chirping in External Modulators," *IEEE Journal of Lightwave Technology*, vol. 6, No. 1, pp. 87–93, (Jan. 1988).

A.H. Gnauck et al., "Dispersion Penalty Reduction Using an Optical Modulator with Adjustable Chirp," *IEEE Photonics Technology Letters*, vol. 3, No. 10, pp. 916–918, (Oct. 1991).

K. Iwashita et al., "Chromatic Dispersion Compensation in Coherent Optical Communications," *IEEE Journal of Lightwave Technology*, vol. 8, No. 3, pp. 367–375, (Mar. 1990).

J.H. Winters, "Equalization in Coherent Lightwave Systems Using Microwave Waveguides," *IEEE Journal of Lightwave Technology*, vol. 7, No. 5, pp. 813–815, (May 1989).

J.H. Winters, "Equalization in Coherent Lightwave Systems Using a Fractionally Spaced Equalizer," *Journal of Lightwave Technology*, vol. 8, No. 10, pp. 1487–1491, (Oct. 1990).

K. Yonenaga et al., "Optical Duobinary Transmission System with No Receiver Sensitivity Degradation," *Electronics Letters*, vol. 31, No. 4, pp. 302–304, (Feb. 1995).

G. May et al., "Extended 10 Gb/s Fiber Transmission Distance at 1538 nra Using a Duobinary Receiver," *IEEE Photonics Technology Letters*, vol. 6, No. 5, pp. 648–650, (May 1994).

(List continued on next page.)

*Primary Examiner*—Georgia V. Epps
*Assistant Examiner*—Dawn-Marie Bey
*Attorney, Agent, or Firm*—Christensen O'Connor Johnson & Kindness PLLC

[57] ABSTRACT

Apparatus for generation of broadband vestigial sideband (VSB) signals primarily for transmission over optical fibers in which the carrier frequency is in the infrared portion of the electromagnetic spectrum. The modulating signal is normally a broadband digital signal. The apparatus includes an optical fiber, an optical signal source coupled to a modulator with first and second modulation signals modulating the carrier optical signal, plus a method of adding carrier optical signal to the modulator output optical signal and coupling to an output optical fiber. The modulation signals are selected such that an output optical signal transmitted along the optical fiber from the modulator has a vestigial single sideband. Part of the carrier optical signal is transmitted with the output optical signal through the use of a bypass loop or through an appropriate combination of the first and second modulation signals.

22 Claims, 7 Drawing Sheets

OTHER PUBLICATIONS

M. Izutsu et al., "Integrated Optical SSB Modulator/Frequency Shifter," *IEEE Journal of Quantum Electronics*, vol. QE–17, No. 11, pp. 2225–2227, (Nov. 1981).

K. Yonenaga et al., "A Fiber Chromatic Dispersion Compensation Technique with an Optical SSB Transmission in Optical Homodyne Detection Systems," *IEEE Photonics Technology Letters*, vol. 5, No. 8, pp. 949–951, (Aug. 1993).

K. Yonenaga et al., "Dispersion Compensation for Homodyne Detection Systems Using a 10–Gb/s Optical PSK–VSB Signal," *IEEE Photonics Technology Letters*, vol. 7, No. 8, pp. 929–931, (Aug. 1995).

S. Haykin, "Weaver's Method," *Communication Systems*, 2nd Edition, J. Wiley and Sons, Inc., New York, (1983).

D.K. Weaver, Jr., "A Third Method of Generation and Detection of Single–Sideband Signals," *Proceedings of the IRE*, vol. 44, pp. 1703–1705, (Dec. 1956).

O.G. Villard, Jr., "Composite Amplitude and Phase Modulation," *Electronics*, pp. 86–89, (Nov. 1948).

K.H. Powers, "The Compatibility Problem in Single–Sideband Transmission," *Proceedings of the IRE*, pp. 1431–1435, (Aug. 1960).

G.B. Lockhart, "A Spectral Theory for Hybrid Modulation," *IEEE Transactions on Communications*, vol. COM–21, No. 7, (Jul. 1973).

Young, T., J. Conradi, W. Tinga and B. Davies, "Generation and Transmission of FM and $\pi/4$ DQPSK Signals at Microwave Frequencies Using Harmonic Generation and Optoelectronic Mixing in Mach–Zehnder Modulators, " *IOOC 95*, pp. 72–73 (Jun. 1995).

Young, T., J. Conradi and W. Tinga, "Generation and Transmission of FM and $\pi/4$ DQPSK Signals at Microwave Frequencies Using Harmonic Generation and Optoelectronic Mixing in Mach–Zehnder Modulators," *IEEE Transactions on Microwave Theory and Techniques*, 44:446–453 (Mar. 1996).

Hakki, B.W., "Dispersion of Microwave–Modulated Optical Signals," *Journal of Lightwave Technology* 11(3):474–480 (Mar. 1993).

OPTICAL MODULATION SYSTEM

FIELD OF THE INVENTION

This invention relates to fiber optic communication systems and to the generation of optical vestigial sideband signals, more particularly, for the purpose of transmitting digital information.

BACKGROUND OF THE INVENTION

The single most fundamental limitation to the signal bandwidth that can be transmitted on optical fibers is chromatic dispersion of the modulated signal in the fiber. In essence, an amplitude modulated optical signal will usually have two information sidebands, one above and the other below the optical frequency of the original light source. The frequencies associated with these sidebands will travel down an optical fiber at different velocities with the result that different parts of the spectrum will arrive at the far end at different times. Thus, if digital signals are sent as narrow pulses, these pulses will be broadened or dispersed, eventually overlapping with neighbouring pulses.

Approaches currently used to reduce the effects of chromatic dispersion include (1) reversing the effects of chromatic dispersion in the optical domain, (2) reversing the effects in the electrical domain and (3) reducing the transmission bandwidth of the optical signal on the fiber. The first is based on purely optical methods where the effects of group velocity dispersion are reversed while the signal is still in the optical domain. Adding dispersion compensating fiber in the transmission path is a common approach. Other optical methods include compensation by differential time delay of the upper and lower sidebands of the modulated signal, see A. Djupsjobacka, O. Sahlen, "Dispersion compensation by differential time delay," IEEE Journal of Lightwave Technology, vol. 12, no. 10, pp. 1849–1853, October 1994; spectrally inverting the signal at the midpoint of the transmission path, see R. M. Jopson, A. H. Gnauck, R. M. Derosier, "10 Gb/s 360-km transmission over normal-dispersion fiber using mid-system spectral inversion," Proceedings OFC'93, paper PD3, 1993; and prechirping the transmitted signal in an external modulator, see F. Koyoma, K. Iga, "Frequency chirping in external modulators," IEEE Journal of Lightwave Technology, vol. 6, no. 1, pp. 87–93, January 1988 and A. H. Gnauck, S. K. Korotky, J. J. Veselka, J. Nagel, C. T. Kemmerer, W. J. Minford, D. T. Moser, "Dispersion penalty reduction using an optical modulator with adjustable chirp," IEEE Photonics Technology Letters, vol. 3, no. 10, pp. 916–918, October 1991.

The second approach, in which dispersion effects are reversed in the electrical domain, is based on coherent transmission and heterodyne detection followed by equalization in the electrical domain. It is important to note that a double sideband (DSB) signal must be heterodyne detected if the signal is to be compensated electrically. If homodyne detection were attempted with a DSB signal, the upper and lower sidebands would overlap upon detection and the phase information would be lost and the higher modulation frequencies severely attenuated or distorted through cancellation of sideband components. Some techniques used or proposed for post-detection equalization include microstrip lines, see K. Iwashita, N. Takachio, "Chromatic dispersion compensation in coherent optical communications," Journal of Lightwave Technology, vol. 8, no. 3, pp. 367–375, March 1990; microwave waveguides, see J. H. Winters, "Equalization in coherent lightwave systems using microwave waveguides," Journal of Lightwave Technology, vol. 7, no. 5, pp. 813–815, May 1989. and fractionally spaced equalizers, see J. H. Winters, "Equalization in coherent lightwave systems using a fractionally spaced equalizer," Journal of Lightwave Technology, vol. 8, no. 10, pp. 1487–1491, October 1990.

The third approach is to modify the transmission format where the baseband signal spectrum is compressed. These types of approaches, which reduce the transmission bandwidth required on the fiber to transmit a given bit rate, are generally implemented by modifying the line code format in order to reduce the effective bandwidth required to transmit or receive the data, see K. Yonenaga, S. Kuwano, S. Norimatsu, N. Shibata, "Optical duobinary transmission system with no receiver sensitivity degradation," Electronics Letters, vol. 31, no. 4, pp. 302–304, February 1995, and G. May, A. Solheim, J. Conradi, "Extended 10 Gb/s fiber transmission distance at 1538 nm using a duobinary receiver," IEEE Photonics Technology Letters, vol. 6, no. 5, pp. 648–650, May 1994.

The generation, transmission and detection of single sideband (SSB) signals has been used in the RF and microwave regions of the electromagnetic spectrum to reduce the bandwidth of the signal by a factor of two, by sending either the upper or the lower sideband. Generation and transmission of SSB optical signals is shown in M. Izutsu, S. Shikama, T. Sueta, "Integrated optical SSB modulator/frequency shifter," IEEE Journal of Quantum Electronics, vol. QE-17, no. 11, pp. 2225–2227, November 1981 with a Mach Zender by and R. Olshansky, "Single sideband optical modulator for lightwave systems," U.S. Pat. No. 5,301,058, 1994. A dispersion benefit accrues from a single sideband signal due to the fact that the transmitted signal spectrum has been reduced by a factor of two.

A more significant advantage of optical SSB transmission is that upon detection, particularly if the signal is coherently detected, a dispersed baseband signal is produced where the information of the relative arrival time of the various signal frequencies remains as part of the electrical output signal and hence the fiber dispersion can be compensated in the electrical domain after detection. This advantage is similar to that for heterodyne detection of DSB signals, but with SSB transmission and detection, the signal can be homodyned directly to baseband using carrier signal added either at the source or at the receiver and thus it can be directly detected with the phase or delay information of the transmitted signal preserved.

An early integrated optical SSB modulator using optical filtering techniques was described in K. Yonenaga, N. Takachio, "A Fiber chromatic dispersion compensation technique with an optical SSB transmission in optical homodyne detection systems," IEEE Photonics Technology Letters, vol. 5, no. 8, pp 949–951, August 1993, where the first optical VSB transmission of baseband digital signals was carried out." In K. Yonenaga, N. Takachio, "Dispersion compensation for homodyne detection systems using a 10 Gb/s optical PSK-VSB signal," IEEE Photonics Technology Letters, vol. 7, no. 8, pp. 929–931, August 1995, the VSB design previously published was improved upon. In R. Olshansky's design, a single sideband optical modulator was described for the purpose of transmitting two or more optical signals with different optical carrier frequencies on a single fiber. The purpose of transmitting the signals in a single sideband format is to permit these optical carrier frequencies to be spaced as closely as the maximum modulation frequency. In one of the variations described in Olshansky, each optical SSB signal was generated with a single Mach-Zehnder (MZ) modulator. The input electrical information was modulated on RF sine and cosine carriers for the purpose of driving each arm of the dual-arm drive MZ modulator. By modulating the input signals on RF carriers, the application can be classified as a narrowband one since the bandwidth of the information signal carried by each RF carrier is small compared to the RF carrier frequency. When an information signal is used to narrowband modulate a sinewave carrier, the Hilbert transform of this modulated sinewave carrier is equivalent to a cosine carrier modulated by the original information signal. Further work on generation of SSB optical signals with a Mach-Zehnder modulator is found in Olshansky, U.S. Pat. no. 5,301,058.

SUMMARY OF THE INVENTION

The primary purpose for transmitting digital signals in optical SSB or VSB format is to combat the effects of chromatic dispersion encountered by the signal as it propagates through an optical fiber.

An optical VSB system can provide close to the same benefits of an optical SSB system since only the phase information of those low modulation frequencies within the vestigial spectrum are not preserved upon self-homodyne detection. Low modulation frequencies are represented in the vestige of the optical sideband which has otherwise been mostly removed. This results in only a very small dispersion impairment since low modulation frequencies are transmitted near the optical carrier frequency and thus encounter very little difference in transmission velocity.

In the invention outlined here in its various aspects, methods and apparatus are described that generate broadband VSB digital signals in an optical form that does not require the use of a specially constructed optical filter and that permit the use of self-homodyne detection of the transmitted light. The invention provides for an improvement in performance relative to conventional double sideband transmission due to a combination of both bandwidth reduction and phase preservation.

Optical transmitters are described that generate optical vestigial sideband (VSB) signals. The description assumes an information source of data in a baseband format which might be in the order of 2.5–100 Gb/s. In all of the designs, the Hilbert transform or an approximation of a Hilbert transform of a baseband input signal is derived. Hilbert transforming a signal is a process which shifts by 90 degrees all frequency components of that signal without changing the amplitude of those components. In all of the designs, both the input signal and the Hilbert transform signal are used to drive an optical modulator to create a VSB signal. Two exemplary designs for the optical transmitter are presented. In the first design, the baseband signal and the Hilbert transform of that signal each drive one arm of a modulator, preferably a dual arm drive Mach-Zehnder (MZ) modulator. The Hilbert transform is created using a tapped delay element. A dc bias is added to one or both arms of the modulator in order to create an optical phase difference of 90 degrees between the optical carrier in each arm of the modulator. In this design, an additional unmodulated optical carrier with the appropriate phase is added to the transmitted signal in order to properly self-homodyne detect the optical signal. The appropriate phase of the added carrier is such that the resultant total output of the modulator is amplitude modulated by the baseband signal and phase modulated by the Hilbert transform of the baseband signal.

In the second design, a combination of the baseband signal and the Hilbert transform of that signal drive one arm and a different combination of the baseband signal and the Hilbert transform signal drive a second arm of a carrier optical signal modulator, for example a dual arm drive MZ modulator. The combination of the baseband signal and its transform are selected so that the amplitude of the square law detected optical signal is affected primarily by the baseband signal, and less so by the Hilbert transform. A dc bias is added to one or both arms of the modulator in order to create a phase difference of 90 degrees between the optical carrier in each arm of the modulator. In this design, additional unmodulated optical carrier does not have to be added to the transmitted signal in order to properly self-homodyne detect the optical signal since the modulation technique used guarantees that some optical carrier will be transmitted.

There are three designs or methods for generating the Hilbert transform of the baseband signal. The first two designs are based on successive mixing of the input signal with a sinusoidal carrier and filtering of this mixed signal to generate the Hilbert transform of the input signal. The third design generates the Hilbert transform of the input signal by weighting and summing delayed versions of the input signal. Several structures, referred to in this patent documents as tapped delay elements, can perform the functions of weighting and summing the delayed versions of the input signal.

The present invention allows self-homodyne detection at the receiver by using the widely adopted square law optical detector. Transmitting an optical VSB signal over fiber will result in reduced effects of chromatic dispersion as compared to transmitting in a DSB format. This is due to bandwidth reduction. Furthermore, the use of VSB instead of DSB allows most of the received signal to be delay equalized upon detection which can largely reverse the effects of chromatic dispersion.

BRIEF DESCRIPTION OF THE DRAWINGS

There will now be described preferred embodiments of the invention, with reference to the drawings, by way of illustration only and without intending to limit the scope of the invention as claimed in the claims, in which like numerals denote like elements and in which:

DETAILED DESCRIPTION OF PREFERRED EMBODIMENTS

Figure 1:
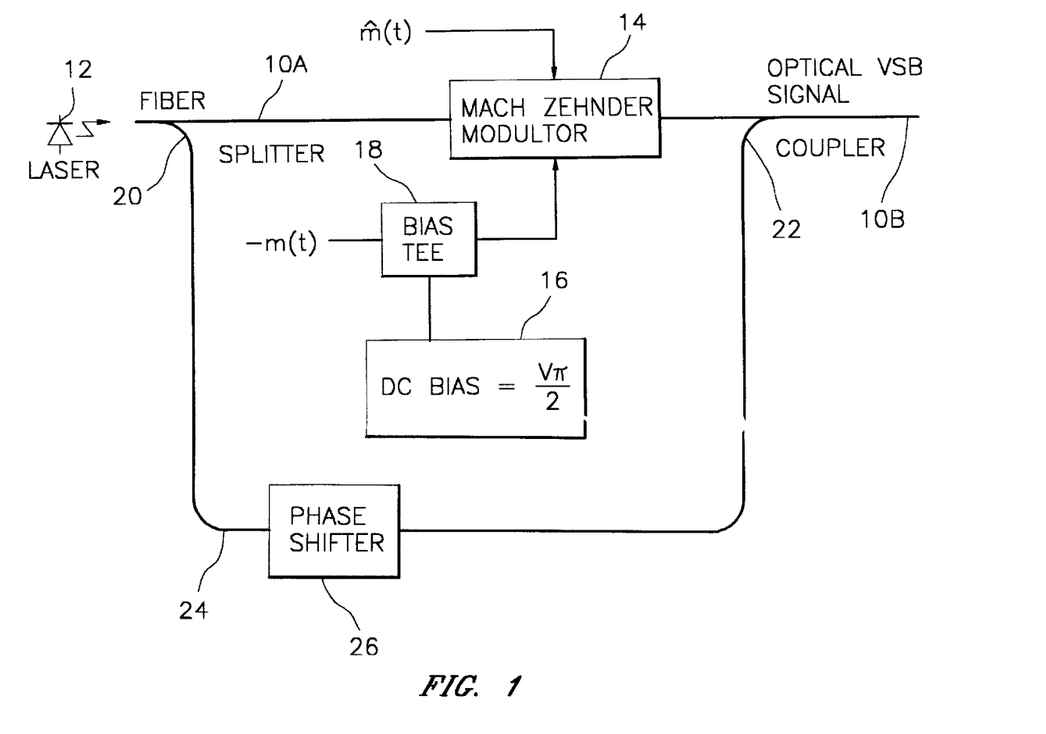
FIG. 1 is a schematic illustration of an optical vestigial sideband transmitter that may be used with a tapped delay element for generating a Hilbert transform according to one asp of the invention.
Figure 2:
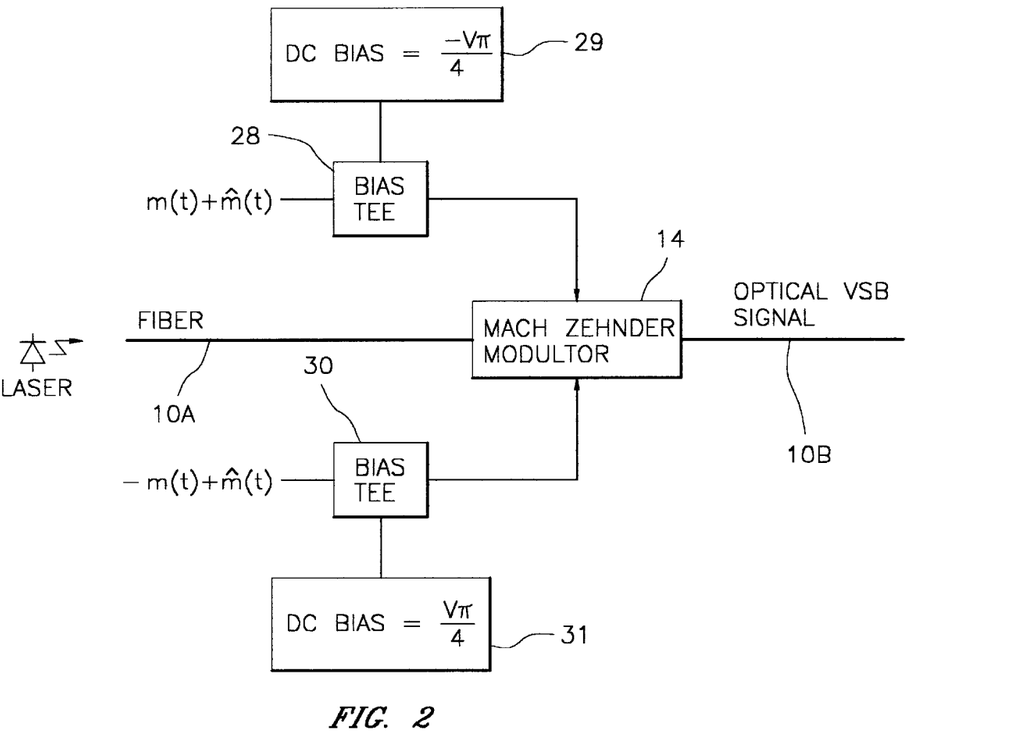
FIG. 2 is a schematic illustration of an optical vestigial sideband transmitter according to a second aspect of the invention.

An exemplary design for an optical transmitter to be used with a Hilbert transform generator according to the invention is shown in FIG. 1. A carrier optical signal is coupled to an optical fiber 10A by laser 12. In this design, baseband signal m(t) and the Hilbert transform $\hat{m}(t)$ of that signal are each modulation signals that drive one arm each of a dual arm drive Mach-Zehnder (MZ) modulator 14 connected between input optical fiber 10A and output optical fiber 10B. A second exemplary design is shown in FIG. 2. While the invention is described in relation to optical signals carried by optical fibers, it will be appreciated that the invention has application to any optical signal transmitted along a suitable light guide. It will further be appreciated that the Hilbert transform of a signal cannot ever be exact, and if it is not exact then to the extent of the inexactness, the modulation output will not be a pure single sideband, but will have a vestigial component.

Figure 3:
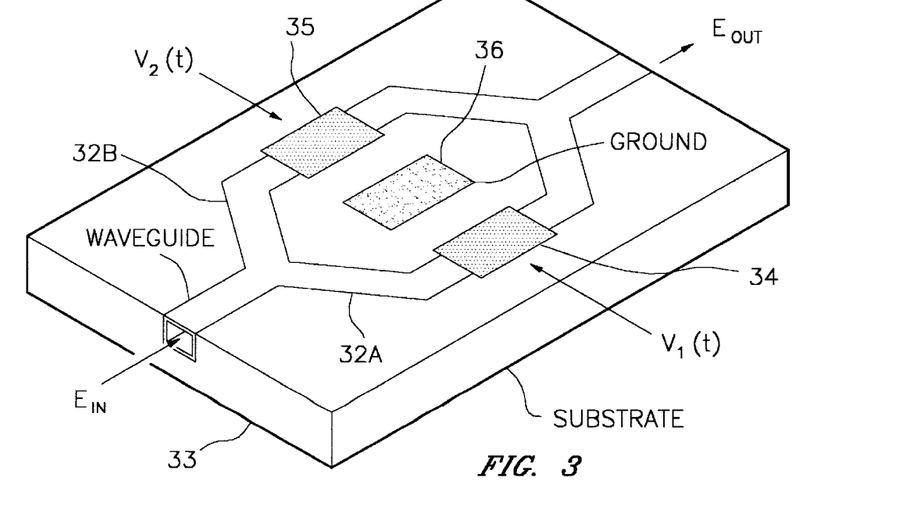
FIG. 3 is a schematic illustration of a dual arm drive Mach Zehnder modulator.

A schematic of a dual arm drive MZ modulator is shown in FIG. 3, including waveguide 32 embedded in a substrate 33. Modulation signals $v_1(t)$ and $v_2(t)$ are applied to electrodes 34 and 35 respectively to phase modulate the optical carrier signal passing along the waveguides 32a and 32b respectively. The electromagnetic field established between the electrode 34 and the ground 36 and between electrode 35 and the ground 36 alters the index of refraction of the waveguide to phase modulate the electrical signals onto the optical signal.

As shown in FIG. 1, a dc bias equivalent to $V_\pi/2$, where $V_{90}$ is the modulator's switching voltage, is added from bias source 16 to the Hilbert transform signal at bias Tee 18 in order to create a phase difference of 90 degrees between the light in each arm of the modulator. The absolute dc bias added to each arm can be varied but the relative difference between the dc bias values in each arm should be as close to $V\pi/2$ as can reasonably be achieved. If a relative difference of $-V\pi/2$ were used, the alternate Upper Sideband (USB) or Lower Sideband (LSB) is transmitted depending on the polarity of $\hat{m}(t)$. Either the USB or LSB is transmitted depending on both the phase response of the fiber and that of any equalizer used at the receiver to reverse the effects of the fiber phase response.

In the embodiment shown in FIG. 1, additional unmodulated optical carrier must be added to the transmitted signal in order to properly self-homodyne detect the optical signal. Means for accomplishing this includes a splitter 20 on the input optical fiber 10A before the modulator 14, a coupler 22 on the output optical fiber 10B after the modulator 14, and an optical fiber loop 24 connected between the splitter 20 and the coupler 22. Delay on the optical fiber loop 24 represented by the phase shifter should be such that carrier optical signal coupled to the output optical fiber 10B is in the appropriate phase relative to the modulated light output from the modulator 14. That is, the additional optical carrier when added to the resultant optical signal from the modulator must produce a total resultant optical signal which is amplitude modulated primarily by m(t) and phase modulated primarily by $\hat{m}(t)$.

Figure 1A:
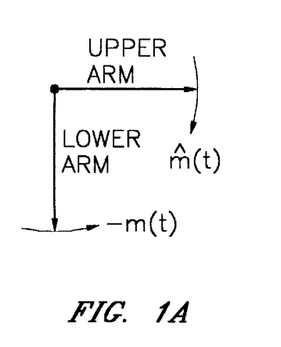
FIGS. 1A and 1B are phasor diagrams showing phase relationship of the signals of FIG. 1.
Figure 1B:
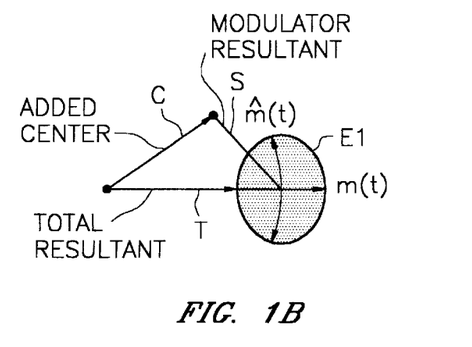

The phase relation of the optical signals in the upper arm and the lower arm of a dual arm Mach-Zehnder (MZ) modulator are shown in the phasor diagram of FIG. 1A. The phase of the optical signal in the upper arm is modulated by $\hat{m}(t)$ and the phase of the optical signal in the lower arm is modulated by -m(t). The upper arm optical signal and the lower arm optical signal are added at the MZ output to form the modulator resultant optical signal S. The ellipse E1 in FIG. 1B represents the possible positions of the resultant S, as m(t) and $\hat{m}(t)$ vary with time. The phase relations of the added carrier, C, the modulator resultant, S, and the total resultant signal T are illustrated in FIG. 1B. The total resultant T is in phase with the varation caused by m(t), and the phase of the added carrier C is adjusted in practice to ensure that this is approximately the case. It will be observed that, with proper added carrier phase, the amplitude changes of the total resultant are primarily affected by only m(t), while $\hat{m}(t)$ has little effect on the amplitude. It can be arranged that $\hat{m}(t)$ has the primary effect on the amplitude of the resultant output optical signal, but this is not preferred.

Self-homodyne detection is a method by which an unmodulated carrier is included in the transmitted signal such that upon square law detection the unmodulated carrier acts as a local oscillator at the receiver so that the information signal is properly mixed to baseband. The power of this additional optical signal should be large enough to properly self-homodyne detect the optical VSB signal. It can be ensured that the added carrier has the appropriate phase in relation to m(t) by varying the delay of the added carrier by trial and error until the proper phase is obtained.

An exemplary design for an optical transmitter according to a second embodiment of the invention is shown in FIG. 2, including the same optical fiber 10A, 10B and modulator 14. In this embodiment of the invention, a linear combination of the baseband signal m(t) and the Hilbert transform $\hat{m}(t)$ of that signal drive one arm and a different combination of the baseband signal and the Hilbert transform signal drive a second arm of the dual arm drive MZ modulator 14. The first combination signal may consist of m(t) +$\hat{m}(t)$ (or an amplified version thereof) while the second combination signal may consist of $-m(t) + \hat{m}(t)$ (or an amplified version thereof). A dc bias is added to one or both arms of the modulator 14 in order to create a phase difference of about 90 degrees between the light in each arm of the modulator 14. In the design shown in FIG. 2, the dc bias added at bias Tee 28 from bias source 29 to the arm driven by m(t) +$\hat{m}(t)$ is equivalent to $-V\pi/4$ while the dc bias added at bias Tee 30 from bias source 31 to the arm driven by $-m(t) + \hat{m}(t)$ is equivalent to $V\pi/4$. Again, the relative difference between the dc bias in each arm should be $V\pi/2$ or $-V\pi/2$ depending on which sideband is to be transmitted. In this design, additional unmodulated optical carrier does not have to be added to the transmitted signal in order to properly self-homodyne detect the optical signal, since the output from the modulator includes unmodulated optical carrier with the appropriate signal phase. This combination of drive signals allows the modulator to be driven such that the phase modulation from $\hat{m}(t)$ is not detected by the square law detector. That is, modulation of the carrier optical signal by the baseband signal and its Hilbert transform results in an output optical signal whose amplitude is primarily affected by amplitude modulation due to the amplitude of the baseband signal m(t). The optical signal, however, remains VSB. Consequently, the design shown in FIG. 2 presents an improvement over the design shown in FIG.1 in that extra unmodulated carrier does not have to be added to the modulated light. Thus, with changes to the electrical drive signals, existing modulator designs can be used without optical modifications.

Various linear combinations of m(t) and m̂(t) may be used providing they fulfill the following conditions:

(1) the output of the modulator has a single or vestigial sideband;

(2) a part of the carrier optical signal passes through the modulator; and (3) the amplitude of the resultant output optical signal is primarily affected only by one of the signals m(t) and m̂(t), preferably m(t).

Figure 2A:
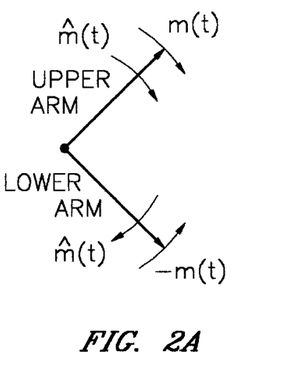
FIGS. 2A and 2B are phasor diagrams showing phase relationship of the signals of FIG. 2.
Figure 2B:
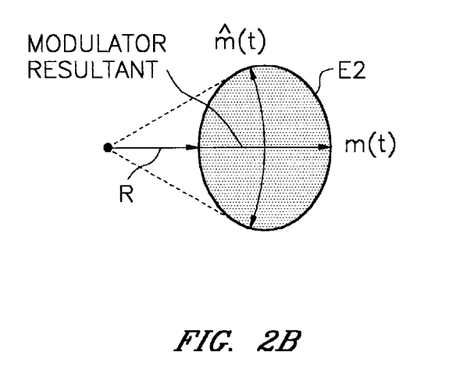

The phase relation of the optical signals in the upper arm and the lower arm of a dual arm Mach-Zender (MZ) modulator of FIG. 2 is illustrated in FIG. 2A. The phase of the optical signal in the upper arm is modulated by m(t) +m̂(t) and the phase of the optical signal in the lower arm is modulated by −m(t) +m̂(t). The upper arm optical signal and the lower arm optical signal are added at the MZ output to form the modulator resultant optical signal R. The ellipse E2 in FIG. 2B represents the possible positions of the resultant, R, as m(t) and m̂(t) vary with time. It is thus seen that the amplitude (length) of R is primarily affected by the signal m(t) and m̂(t) does not significantly affect the amplitude of R. Hence, the signal m(t) can be recovered from the amplitude variation of R. This combination of m(t) and m̂(t) for the MZ drive signals allows for larger optical signal modulation with less distortion than the method of Olshansky.

Figure 4:
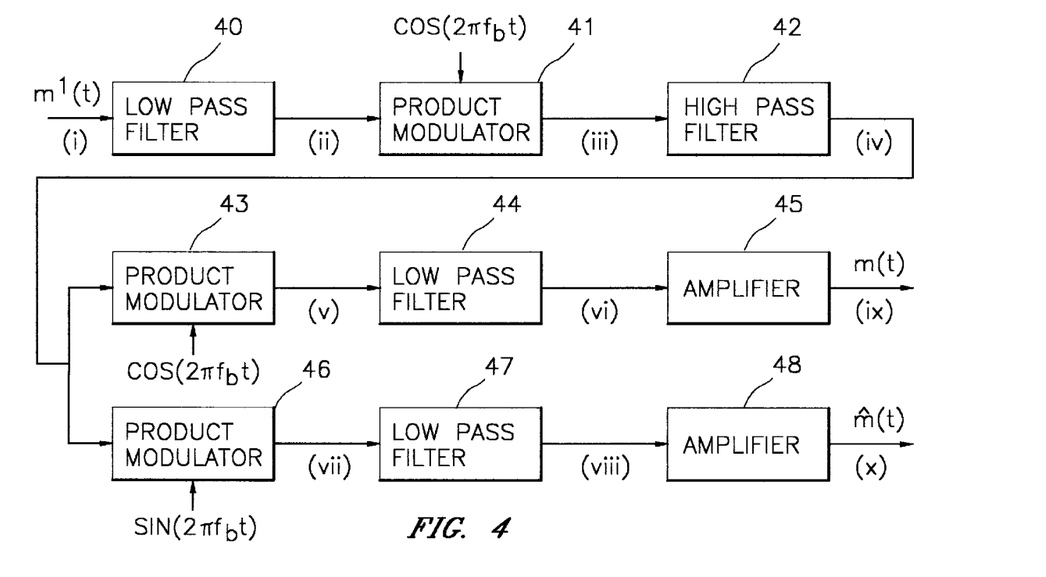
FIG. 4 is a schematic illustration of a modified version of Weaver's method for generating a signal and the Hilbert transform of that signal.

In a first design to generate the Hilbert transform of a baseband signal, a modified version of Weaver's approach is used as shown in FIG. 4. A method of generating an electrical SSB signal was originally disclosed by Weaver 1956. In this modified approach the carrier frequency, $f_b$, used in the various product modulators is equal to the frequency at which the first null in the power spectral density of the input baseband data signal occurs. For binary data signals, this frequency is at the bit rate, for multi-level signals this frequency is at the baud rate.

The input signal m'(t) at (i) in FIG. 4 is first bandlimited by filter 40 and, for binary data signals, this is usually limited to frequencies less than $f_b$. In FIG. 4, the bandlimited signal at point (ii) is passed to product modulator 41 where it amplitude modulates, in double sideband form, a cosine carrier whose frequency is equal to bit rate $f_b$ to form the signal at point (iii). This is filtered in high pass filter 42 to leave the upper sideband at point (iv). It is possible to use a lowpass filter in place of the highpass prefilter; however, there is an implementation advantage to a highpass or a bandpass design at frequencies above 10 GHz. Furthermore, the highpass filter results in a larger gap between wanted and unwanted frequencies at points (v) and (vi) and this reduces the required complexity of the lowpass filters which follow.

Output from the high pass filter 42 is passed to product modulator 43 where it modulates the same carrier signal as at product modulator 42. Product modulation output from this product modulator 43 is low pass filtered at filter 44 and amplified using amplifier 45 as required to yield m(t). Output from the high pass filter 42 is also passed to product modulator 46 where it modulates the same carrier signal as at product modulator 42 but where the carrier has been shifted in phase by 90°. Thus, if the carrier at 41 is a cosine carrier, the carrier at 46 is a sine carrier, and vice versa. Product modulation output from this product modulator 46 is low pass filtered at filter 47 and amplified using amplifier 48 as required to yield m̂(t). The first inphase modulator and filter has output m(t) at point (ix) which is substantially the same as the input signal. The first quadrature modulator and filter has output m̂(t) at point (x) which is the Hilbert transform of m(t). The magnitude spectrum of m(t) is the same as m̂(t) but the phase spectrum is different. The modulation system shown in FIG. 4 has the capability of handling DC signals, but the filter 42 must be carefully designed with 50% gain at fb and symmetric about the center.

Figure 5:
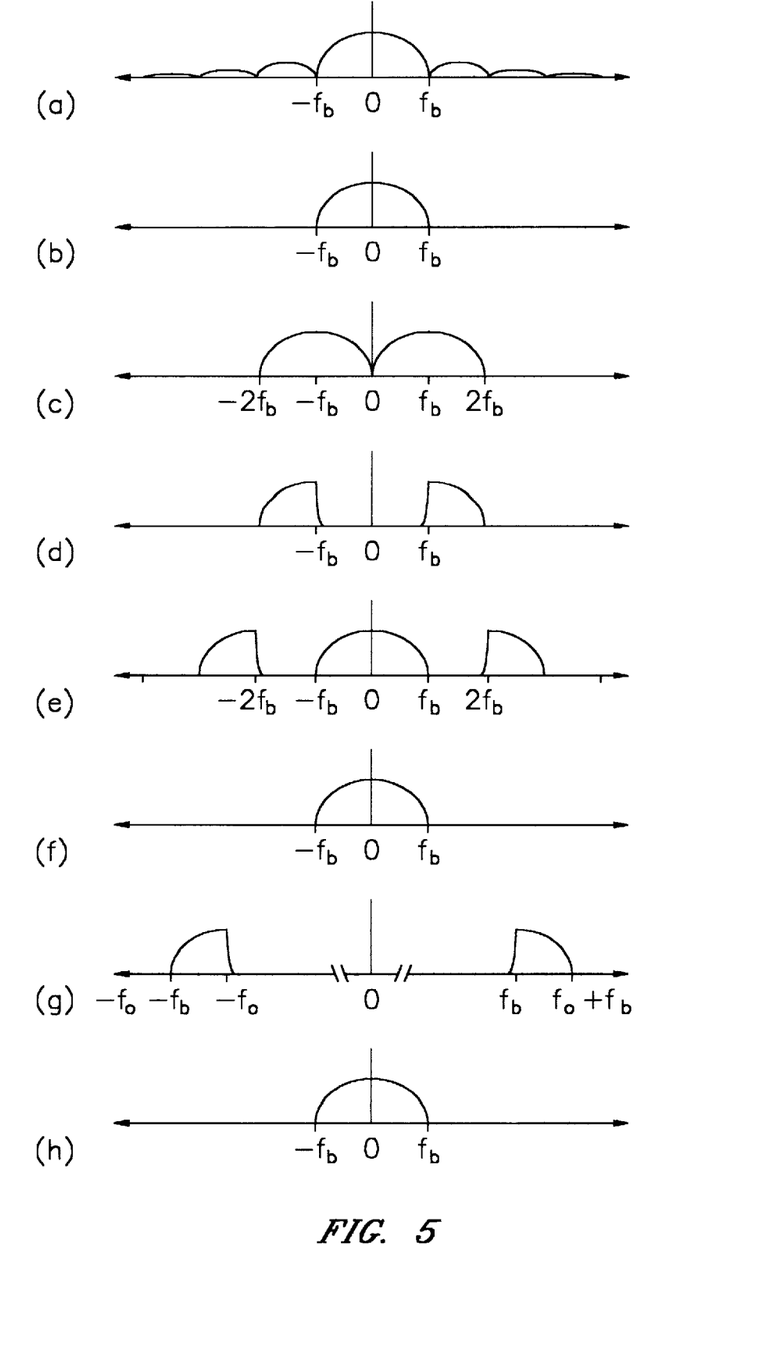
FIG. 5 shows the signal spectra of an arbitrary baseband signal at various stages of the design which implements the modified Weaver approach to generate a signal and the Hilbert transform of that signal.

The spectra of the signals at various stages in the system using the Hilbert transform generator shown in FIG. 4 are shown in FIG. 5. An arbitrary binary baseband signal is chosen for illustrative purposes. FIG. 5(a) represents the original baseband signal while FIG. 5(b) represents the lowpass filtered version of FIG. 5(a). FIG. 5(c) represents the spectrum after the modulation by the first carrier and FIG. 5(d) represents the highpass filtered version of FIG. 5(c). FIG. 5(e) represents the signal after the second mixing and FIG. 5(f) the lowpass filtered version of FIG. 5(e). The output of the optical transmitter which results in a optical VSB signal is shown in FIG. 5(g). At the receiver, self-homodyne detection by a square law optical detector results in the recovered baseband spectrum shown in FIG. 5(h).

In contrast to Weaver's method, the design disclosed here uses lowpass filters and first quadrature modulators operating at $f_b$ equal to B, the bandwidth required to transmit the information signal, as opposed to 0.5B as Weaver does. Further, the method disclosed here does not require oscillation frequencies other than $f_b$ equal to the baud rate B for modulation or demodulation. This frequency is readily available in any digital system. Finally, the orientation of the final optical SSB spectrum is correct such that self-homodyne detection results in the proper receive baseband signal.

Figure 6:
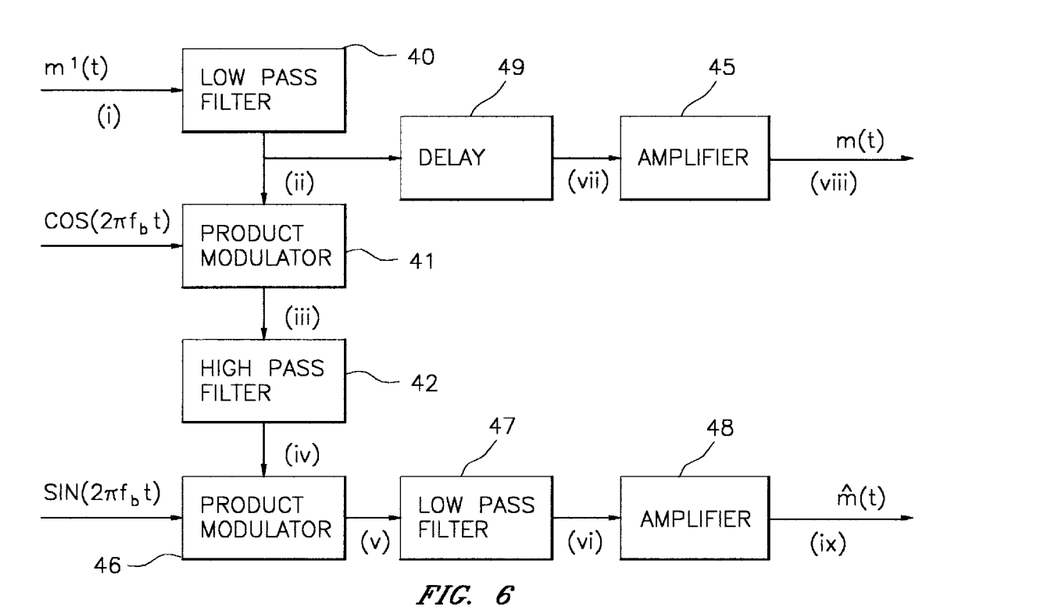
FIG. 6 a schematic illustration of a second modified version of Weaver's method for generating a signal and the Hilbert transform of that signal.

In FIG. 6, a modified version of the implementation shown in FIG. 4 which generates the Hilbert transform is shown. In FIG. 4, the signals at points (ii) and (ix) are essentially the same so the redundant components can be removed, leaving low pass filter 40, product modulator 41, high pass filter 42, product modulator 46, low pass filter 47 and amplifiers 45 and 48. The original components are still required for the bottom path in order to generate m̂(t). A delay 49 must be added in the path generating m(t) to adjust its phase to the phase of m̂(t).

Figure 7:
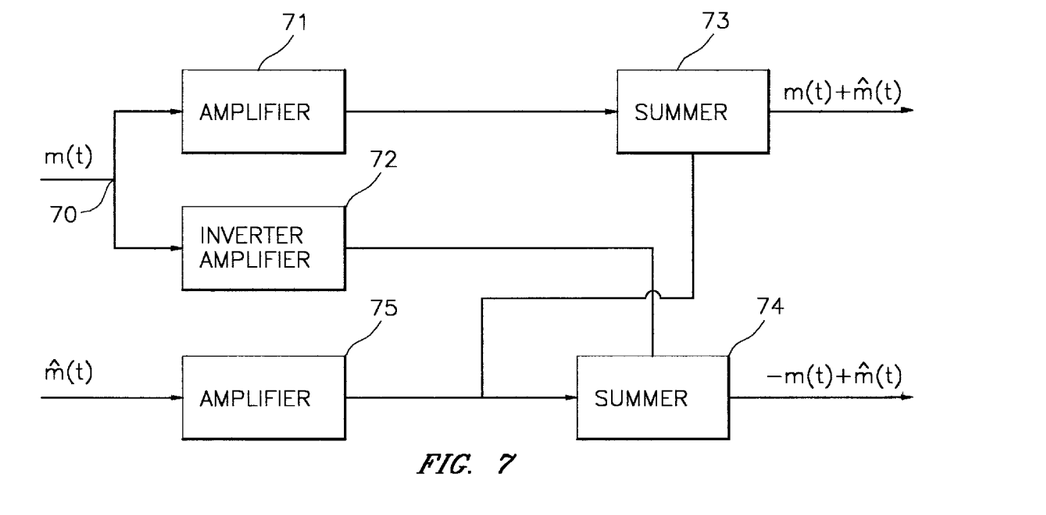
FIG. 7 is a schematic illustration of a method for generating two combinations of a signal and the Hilbert transform of that signal.

In order to generate the combination signals m(t) +m̂(t) and −m(t) +m̂(t), the designs shown in FIG. 4 and FIG. 6 can be modified to include the design shown in FIG. 7. Signal m(t) is split at 70, amplified in amplifier 71, inverted by inverting amplifier 72. The amplified signal is fed to summer 73, and the inverted signal to summer 74. At the same time, signal m̂(t) is amplified in amplifier 75 and fed to both summer 73 and 74 to yield a linear combination of the signals m(t) and m̂(t).

Figure 8:
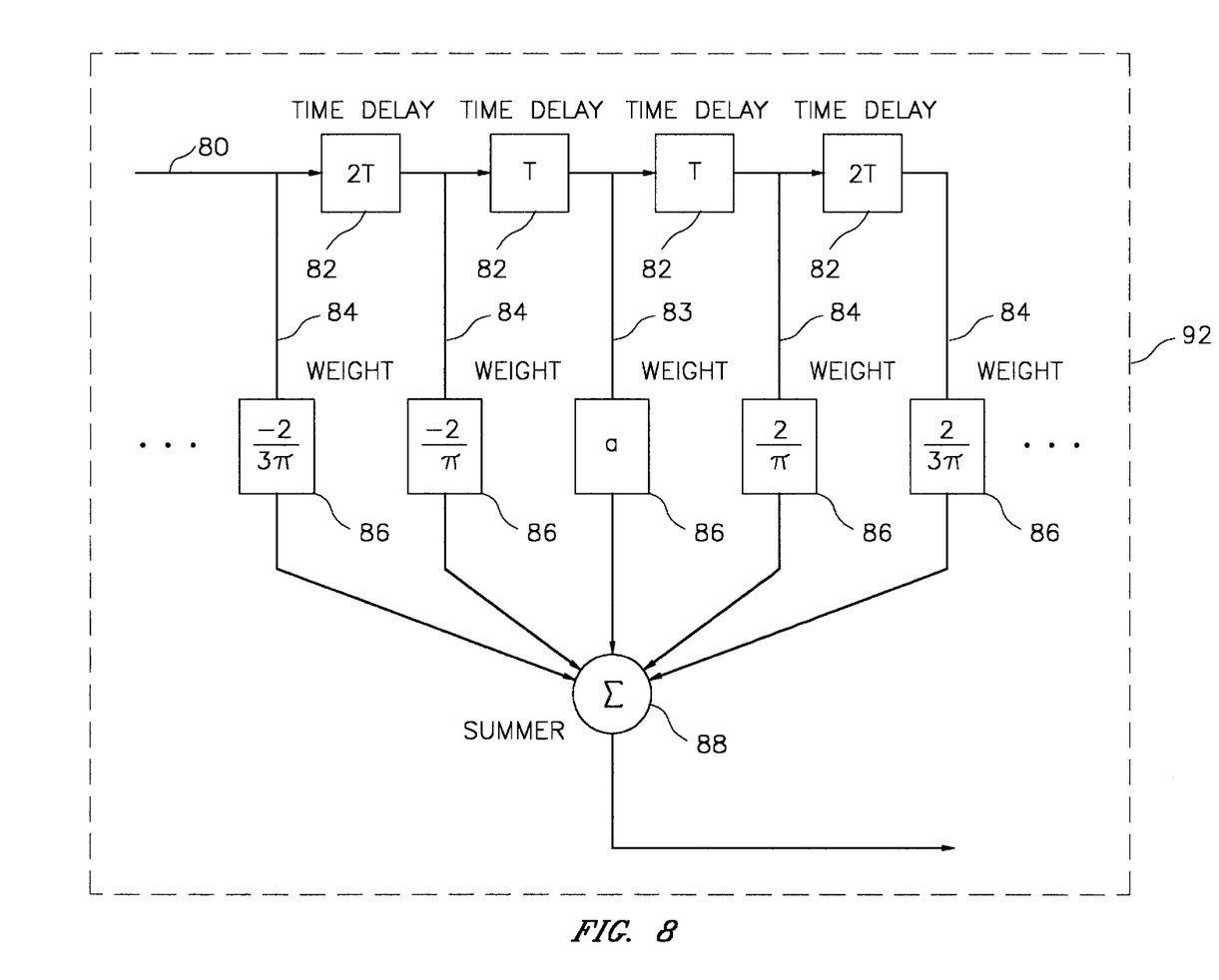
FIG. 8 is a generalized schematic illustration of a tapped delay method for generating an approximation of the Hilbert trans form of a signal.
Figure 9:
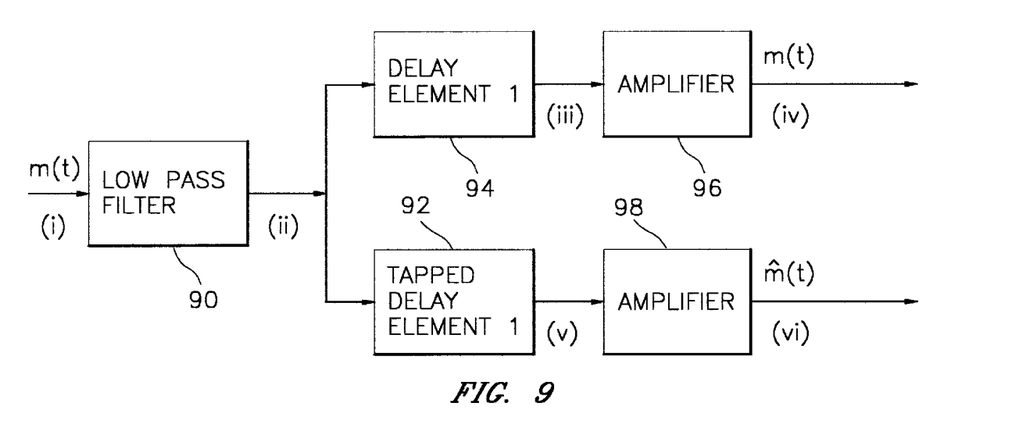
FIG. 9 is a schematic illustration of a tapped delay element system which provides a signal and the approximate Hilbert transform of that signal.

In the third design to generate the Hilbert transform signal shown in FIG. 8, the Hilbert transforming function is carried out by a tapped delay element 92. This tapped delay approach to generating a Hilbert transform is known in the art of generating Hilbert transforms in itself. Tapped delay element 92 serves to take a time derivative of the signal and apply a frequency dependent weighting such that each frequency component has the same amplitude before and after time differentiation. The tapped delay Hilbert transform has zero output at 0 Hz (DC). Thus for DC and very low frequencies, there is no phase modulation of the optical output and thus the transmitted optical spectrum is double sideband (DSB) for very low frequencies. The total time delay through tapped delay element 92 determines the lowest frequency which will have equal amplitude at the input and the output while the time delay T determines the highest frequency which can be differentiated with respect to time. As shown in FIG. 9, the signal m(t) is first low pass filtered in low pass filter 90 (FIG. 9) and then as shown in FIG. 8 passed along bus 80 through delays 82 which have delay 2T between tap lines 84 and have delay T on either side of the center tap 83. Tap lines 84, 83 connect to the bus 80 after each delay 82 and the tapped signals are weighted by weights 86 as indicated in FIG. 8 and added in summer 88. The configuration shown in FIG. 8 can be created with discrete element splitters, delay lines and combiners or each entire filter can be fabricated in microstrip form.

As shown in FIG. 8, the tapped delay element 92 is symmetrical, and has an impulse response defined by $h(t) = \Sigma\frac{1}{2}(n\pi)^{-1}\delta(t-n)T$ for n=−N to +N, where n is odd, 2T is the time delay between taps and 2N is the total number of taps in the delay element.

In order to generate the proper signals for the first optical modulator design, the design shown in FIG. 9 is used. The signal m(t) is simply time delayed by time delay 94 in order to properly phase it with the Hilbert signal m̂(t) and amplified as required in amplifier 96. In FIG. 9, the Hilbert transform is shown as being created from Tapped Delay Element 92 followed by amplifier 98. Tapped Delay Element 92 should employ the tapped delay element shown in FIG. 8 with coefficient a equal to 0. If a filter with four taps were used as an example, a time delay of 3T is required for m(t) in order to properly phase it with the Hilbert signal m̂(t). The value of 2T is generally less than one bit period for a digital signal. For example, T is of the order of 40 ps for a 10 Gb/s binary source.

Figure 10:
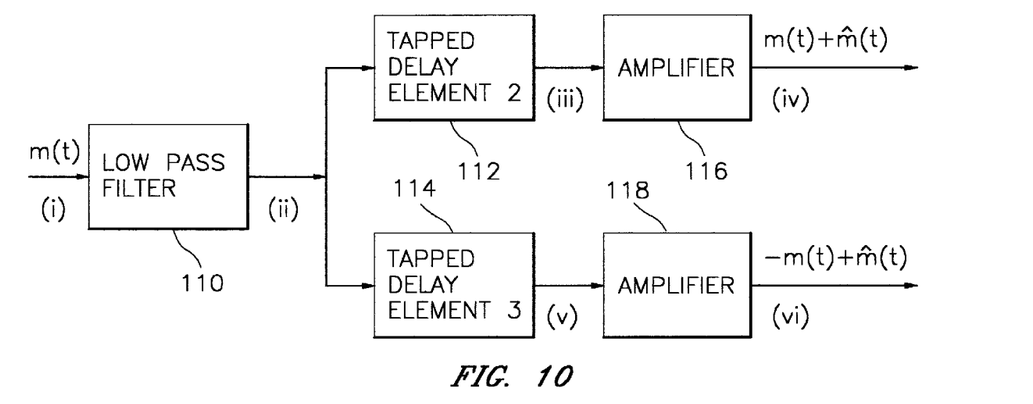
FIG. 10 is a schematic illustration of a tapped delay element system which provides two combinations of a signal and the approximate Hilbert transform of that signal.

In order to generate the proper signals for the second embodiment of the optical modulator, the design shown in FIG. 10 is used. The baseband signal m(t) is first low pass filtered at filter 110 and passed to tapped delay elements 112 and 114. Tapped Delay Element 112 employs the tapped delay element 92 shown in FIG. 8 with coefficient a equal to 1 thus generating the signal m(t) +m̂(t). Tapped Delay Element 114 employs the tapped delay element shown in FIG. 8 with coefficient a equal to −1 thus generating the signal −m(t) +m̂(t). Appropriate amplifiers 116 and 118 are used to condition the output from the tapped delay elements 112 and 114.

Figure 11:
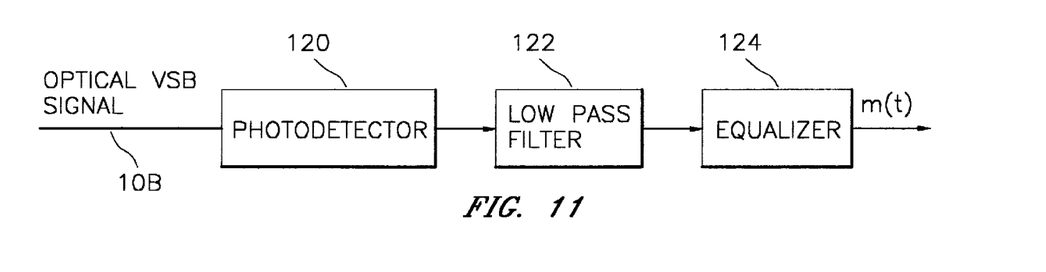
FIG. 11 is a schematic illustration of a receiver system that detects the optical VSB signal and equalizes the phase of the received electrical signal.

All of the optical signals generated are converted to electrical baseband signals in an optical receiver using the general design shown in FIG. 11. The output optical light guide 10B, typically an optical fiber transmission line, forms part of a transmission system in which the output optical light guide 10B induces phase distortion of transmitted signals. The received optical signal is detected by a simple photodetector 120 employing the common square-law detection operation. The subsequent electrical signal is filtered by low pass filter 122 to reduce noise power and equalized in electrical equalizer 124 to remove phase distortion induced by the optical light guide 10B and restore the original phase of the information signal m(t). The equalization can be performed with a microstrip equalizer or other types of equalizers which have the inverse phase characteristic of the fiber used for transmission. Electrical amplifiers are added where appropriate. Accordingly, this invention is capable of modulating signals where the baseband digital broadband signal m(t) includes a DC component, and the information in the signal is coded by amplitude shift keying. It will be appreciated that the Hilbert transform and the 90° phase differentials referred to in the claims are only approximations, although severe departure from the exactness of the Hilbert transform or from 90° phase shifts results in a degradation of performance.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. An optical signal modulation system, comprising:
   an input optical light guide;
   an optical signal source coupled to the input optical light guide for supplying the input optical light guide with a carrier optical signal;
   an output optical light guide;
   a source of a first modulation signal to be transmitted along the output optical light guide;
   means for generating a second modulation signal as the Hilbert transform of the first modulation signal;
   a modulator connected between the input optical light guide and the output optical light guide for modulating the first and second modulation signals onto the carrier optical signal, such that an output optical signal transmitted along the output optical light guide from the modulator has the form of a vestigial sideband signal; and
   means for transmitting part of the carrier optical signal with the output optical signal along the output optical light guide.

2. The optical signal modulation system of claim 1 in which the modulator is a dual arm drive Mach Zehnder modulator and further including means for adding DC bias to one or both arms of the Mach Zehnder modulator in order to create an optical phase difference of 90 degrees between carrier optical signal in each arm of the Mach Zehnder modulator.

3. The optical signal modulation system of claim 1 in which the means for transmitting part of the carrier optical signal includes:
   a splitter on the input optical light guide before the modulator;
   a coupler on the output optical light guide after the modulator;
   an optical light guide loop connected between the splitter and the coupler; and
   the optical light guide loop having a phase shift such that carrier optical signal coupled to the optical light guide produces a resultant modulated light output from the modulator in phase with amplitude variation caused by the first modulation signal.

4. The optical signal modulation system of claim 1 in which the output optical light guide forms part of a transmission system in which the output optical light guide induces phase distortion of transmitted signals and further in combination with:
   a photodetector coupled to the output optical light guide; and
   an electrical equalizer after the photodetector to remove phase distortion of the transmitted signals induced by the output optical light guide.

5. The optical signal modulation system of claim 1 in which the means for generating a second modulation signal as the Hilbert transform of the first modulation signal comprises a tapped delay element and the tapped delay element has symmetrical tap weighting amplitudes about a center tap.

6. The optical signal modulation system of claim 5 in which the tapped delay element has an impulse response defined by $h(t)=\Sigma\frac{1}{2}n^{-1}\delta(t-n)T$ for $n=-N/2$ to $+N/2$, where n is odd and T is the time delay between taps.

7. The optical signal modulation system of claim 1 further including:

means for forming a first linear combination of the first modulation signal and the second modulation signal;

means for forming a second linear combination of the first modulation signal and the second modulation signal; and the first and second linear combinations being selected such that modulation of the carrier optical signal with the first linear combination and with the second linear combination results in an output optical signal that includes part of the carrier optical signal.

8. The optical signal modulation system of claim 7 in which the linear combinations are selected such that the amplitude of the output optical signal is primarily affected by amplitude modulation due to only one of the first and second modulation signals.

9. The optical signal modulation system of claim 8 in which:

the first linear combination is proportional to the first modulation signal plus the second modulation signal; and the second linear combination is proportional to the negative of the first modulation signal, plus the second modulation signal.

10. An optical signal modulation system, comprising:

an input optical light guide;

an optical signal source coupled to the input optical light guide for supplying the input optical light guide with a carrier optical signal;

an output optical light guide;

a source of a first modulation signal to be transmitted along the output optical light guide;

means for generating a second modulation signal as the Hilbert transform of the first modulation signal;

a dual arm drive Mach-Zehnder modulator connected between the input optical light guide and the output optical light guide for modulating the first and second modulation signals onto the carrier optical signal, such that an output optical signal transmitted along the output optical light guide from the modulator has the form of a vestigial sideband signal; and means for adding DC bias to one or both arms of said Mach Zehnder modulator in order to create an optical phase difference of 90 degrees between carrier optical signal in each arm of said Mach Zehnder modulator.

11. An optical signal modulation system, comprising:

an input optical light guide;

an optical signal source coupled to the input optical light guide for supplying the input optical light guide with a carrier optical signal;

an output optical light guide;

a source of a first modulation signal to be transmitted along the output optical light guide;

means for generating a second modulation signal as the Hilbert transform of the first modulation signal;

means for forming a first linear combination of the first modulation signal and its Hilbert transform;

means for forming a second linear combination of the first modulation signal and its Hilbert transform;

a modulator connected between the input optical light guide and the output optical light guide for modulating the first and second modulation signals onto the carrier optical signal, such that an output optical signal transmitted along the output optical light guide from the modulator has a single or vestigial sideband; and the first and second linear combinations being selected such that modulation of the carrier optical signal with the first linear combination and with the second linear combination results in an output optical signal that includes part of the carrier optical signal.

12. The optical signal modulation system of claim 11 in which the first and second linear combinations are selected such that the amplitude of the output optical signal is primarily affected by amplitude modulation due to the amplitude of only one of the first and second modulation signals.

13. The optical signal modulation system of claim 12 in which:

the first linear combination is proportional to the first modulation signal plus the second modulation signal; and the second linear combination is proportional to the negative of the first modulation signal plus the second modulation signal.

14. The optical signal modulation system of claim 11 in which the modulator is a dual arm drive Mach Zehnder modulator and further including means for adding DC bias to one or both arms of the Mach Zehnder modulator in order to create an optical phase difference of 90 degrees between carrier optical signal in each arm of the Mach Zehnder modulator.

15. The optical signal modulation system of claim 11 in which the means for generating a Hilbert transform of the first modulation signal includes:

a first product modulator whose inputs are the first modulation signal having a baud rate fb and a first carrier signal whose frequency is the baud rate fb, the first product modulator having a first product modulation output;

means for selecting a single sideband of the first product modulation output;

a second product modulator whose inputs are a second carrier signal having the frequency fb, the second carrier signal being 90E out of phase with the first carrier signal, the second product modulator having second product modulation output; and a low pass filter for filtering the second product modulation output.

16. The optical signal modulation system of claim 11 in which the output optical light guide forms part of a transmission system in which the output optical light guide induces phase distortion of transmitted signals and further in combination with:

a photodetector coupled to the output optical light guide; and an electrical equalizer after the photodetector to remove phase distortion of the transmitted signals induced by the output optical light guide.

17. The optical signal modulation system of claim 11 in which the means for generating the second modulation signal includes a tapped delay element.

18. The optical signal modulation system of claim 17 in which the tapped delay element has symmetrical tap weighting magnitudes about a center tap.

19. The optical signal modulation system of claim 18 in which the tapped delay element has an impulse response defined by $h(t)=\Sigma\frac{1}{2}n^{-1}\delta(t-n)T$ for $n=-N/2$ to $+N/2$, where n is odd and T is the time delay between taps.

20. An optical signal modulation system, comprising:

an input optical light guide;

an optical signal source coupled to the input optical light guide for supplying the input optical light guide with a carrier optical signal;

an output optical light guide that forms part of a transmission system in which the output optical light guide induces phase distortion of transmitted signals;

a photodetector coupled to the output optical light guide;

an electrical equalizer located after the photodetector to remove phase distortion of the transmitted signals induced by the output optical light guide;

a source of a first modulation signal to be transmitted along the output optical light guide;

means for generating a second modulation signal as the Hilbert transform of the first modulation signal; and a modulator connected between the input optical light guide and the output optical light guide for modulating the first and second modulation signals onto the carrier optical signal, such that an output optical signal transmitted along the output optical light guide from the modulator has the form of a vestigial sideband signal.

21. An optical signal modulation system, comprising:

an input optical light guide;

an optical signal source coupled to the input optical light guide for supplying the input optical light guide with a carrier optical signal;

an output optical light guide;

a source of a first modulation signal to be transmitted along the output optical light guide;

means, including a tapped delay element, for generating a second modulation signal as the Hilbert transform of the first modulation signal, said tapped delay element having symmetrical tap weighting amplitudes about a center tap; and a modulator connected between the input optical light guide and the output optical light guide for modulating the first and second modulation signals onto the carrier optical signal, such that an output optical signal transmitted along the output optical light guide from the modulator has the form of a vestigial sideband signal.

22. An optical signal modulation system, comprising:

an input optical light guide;

an optical signal source coupled to the input optical light guide for supplying the input optical light guide with a carrier optical signal;

an output optical light guide;

a source of a first modulation signal to be transmitted along the output optical light guide;

means for generating a second modulation signal as the Hilbert transform of the first modulation signal;

means for forming a first linear combination of the first modulation signal and the second modulation signal;

means for forming a second linear combination of the first modulation signal and the second modulation signal, the first and second linear combinations being selected such that modulation of the carrier optical signal with the first linear combination and with the second linear combination results in an output optical signal that includes part of the carrier optical signal; and a modulator connected between the input optical light guide and the output optical light guide for modulating the first and second modulation signals onto the carrier optical signal, such that an output optical signal transmitted along the output optical light guide from the modulator has the form of a vestigial sideband signal.

* * * * *

UNITED STATES PATENT AND TRADEMARK OFFICE
CERTIFICATE OF CORRECTION

PATENT NO. : 5,880,870
DATED : March 9, 1999
INVENTOR(S) : M.J. Sieben et al.

It is certified that error appears in the above-indentified patent and that said Letters Patent is hereby corrected as shown below:

On the title page,

| COLUMN | LINE | |
|---|---|---|
| [56] Pg. 1, col. 1 | Refs. Cited (U.S. Patents, Item 1) | "4,688,705" should read --4,686,705-- |
| [56] Pg. 1, col. 2 | Refs. Cited (Other Publs., Item 10) | "nra" should read --nm-- |
| 12 (Claim 15, | 41 line 5) | "fb" should read --$f_b$-- |
| 12 (Claim 15, | 42 line 6) | "fb," should read --$f_b$,-- |
| 12 (Claim 15, | 48 line 12) | "fb," should read --$f_b$,-- |

Signed and Sealed this

Thirteenth Day of July, 1999

Attest:

Q. TODD DICKINSON

*Attesting Officer*  *Acting Commissioner of Patents and Trademarks*